March 31, 1942.   L. H. ROGERS   2,278,095
ELECTRICAL TOOTHBRUSH
Filed June 13, 1941

Inventor
LOVEN HUGH ROGERS,
By *Clarence A. O'Brien*
Attorney

Patented Mar. 31, 1942

2,278,095

UNITED STATES PATENT OFFICE 2,278,095

ELECTRICAL TOOTHBRUSH

Loven Hugh Rogers, Del Rio, Tex.

Application June 13, 1941, Serial No. 397,955

1 Claim. (Cl. 15—28)

This invention relates to an electrical tooth brush, the general object of the invention being to provide a casing forming a handle for the device and containing a motor, an angle-shaped piece detachably connected to one end of the casing and carrying the brush with means for driving the brush from the motor.

This invention also consists in certain other features of construction and in the combination and arrangement of the several parts to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which—

Figure 1:
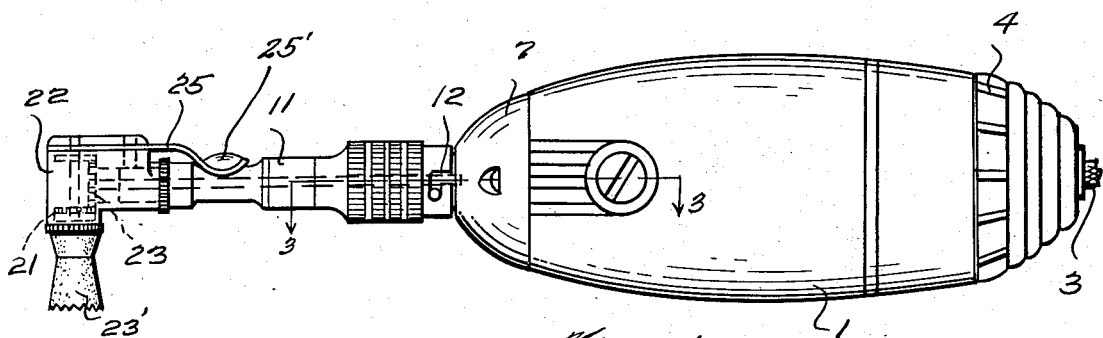
Figure 1 is an elevational view of the device.
Figure 2:
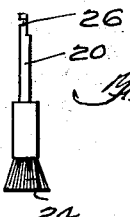
Figure 2 is a view of a brush which can be used in place of the rubber brush shown in Figure 1.
Figures 3, 4:
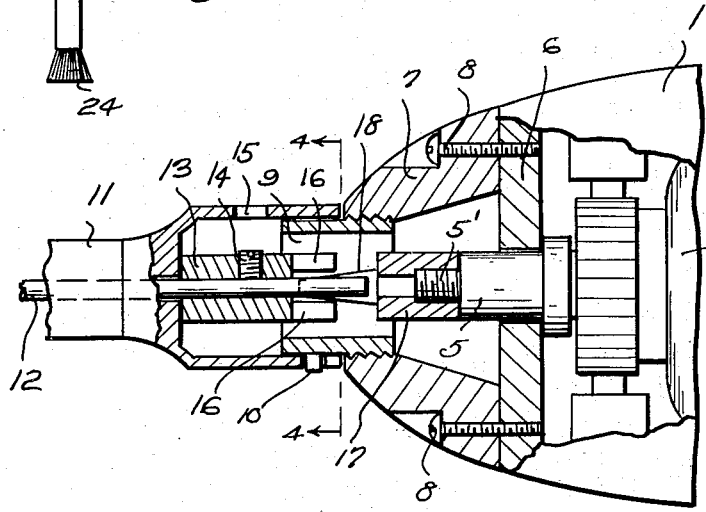
Figure 3 is a section on the line 3—3 of Figure 1.
Figure 4 is a section on the line 4—4 of Figure 3.
Figure 5:
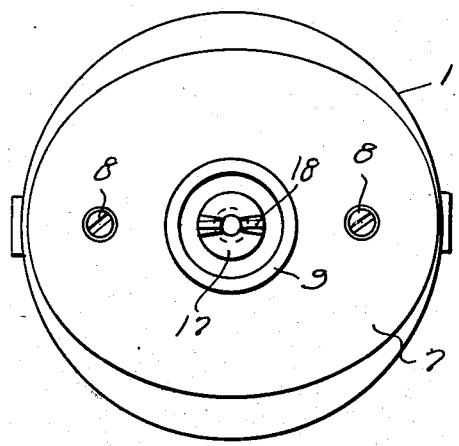
Figure 5 is a view of the front end of the casing with the handle piece removed.

In these views the numeral 1 indicates the casing of elongated shape and is so formed as to form a handle and this casing contains a motor 2, the conductors 3 of which lead from the rear end of the casing and a rotary switch 4 is carried by the casing for controlling the flow of current to the motor. The shaft of the motor is shown at 5 and extends through an opening in a cover plate 6 at the front end of the casing. A cover member 7 preferably of hard rubber or composition is attached to the plate 6 through means of the screws 8 and the shaft 5 extends into the cover member where it terminates in a threaded part 5'. A short sleeve 9 is threaded in the end of the cover member 7 and carries a projection 10. The dental right angle handle piece 11 has a bayonet slot 12 in one end thereof for receiving the pin 10 so that the handle piece 11 is detachably connected to the casing through means of the sleeve 9. A shaft 12 is rotatably arranged in the handle piece and a sleeve 13 is fastened to the inner end of the shaft by means of a screw 14, access to which can be had through an opening 15 in the inner end of the handle member. A pair of prongs 16 are formed on the inner end of the sleeve 13 or that end which extends into the sleeve 9 and a sleeve 17 is threaded to the part 5' of the shaft 5 and has a pair of prongs 18 at its outer end for inter-engaging with the prongs 16 to communicate movement of the shaft 5 to the shaft 12 through means of the sleeves 13 and 17. The brushes are each formed with a stem 20 for engaging a gear 21 in the head 22 of the handle 11 and a gear 23 on the shaft 12 meshes with the gear 21 to impart rotary movement to the brush from the shaft 12. The brushes can be of different forms such as the rubber brush 23' shown in Figure 1 or a bristle brush shown at 24 in Figure 2, and a manually operated latch member 25 is pivoted to the handle member 11 and has one end engaging a notch 26 in each brush stem for detachably holding the stem in the head 22. This latch member is of the spring type and has an arcuate part 25' for engaging a part of the member 11 to releasably hold the latch member in position holding a brush stem in operated position in the head.

If desired the sleeve 17 can form an integral part of the motor shaft.

Thus it will be seen that I have provided a motor driven device with which different types of brushes can be used for cleaning the teeth in an effective manner with the parts being easily removed for repair and cleaning purposes.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

In combination with a casing having a motor therein and a handle member detachably connected with the casing and having a shaft therein, a sleeve detachably connected with the motor shaft and having a pair of oppositely arranged prongs projecting from its outer end, a second sleeve through which the inner end of the shaft in the handle member passes, a screw for adjustably and detachably connecting the second sleeve to the last-mentioned shaft and a pair of prongs on the second sleeve for interlocking with the prongs of the first sleeve when the handle member is connected with the motor casing, whereby the shaft in the handle member is rotated from the motor, said prongs tapering to the free ends.

LOVEN HUGH ROGERS.